(No Model.)
J. SHARKEY.
AXLE LUBRICATOR.
No. 444,582. Patented Jan. 13, 1891.
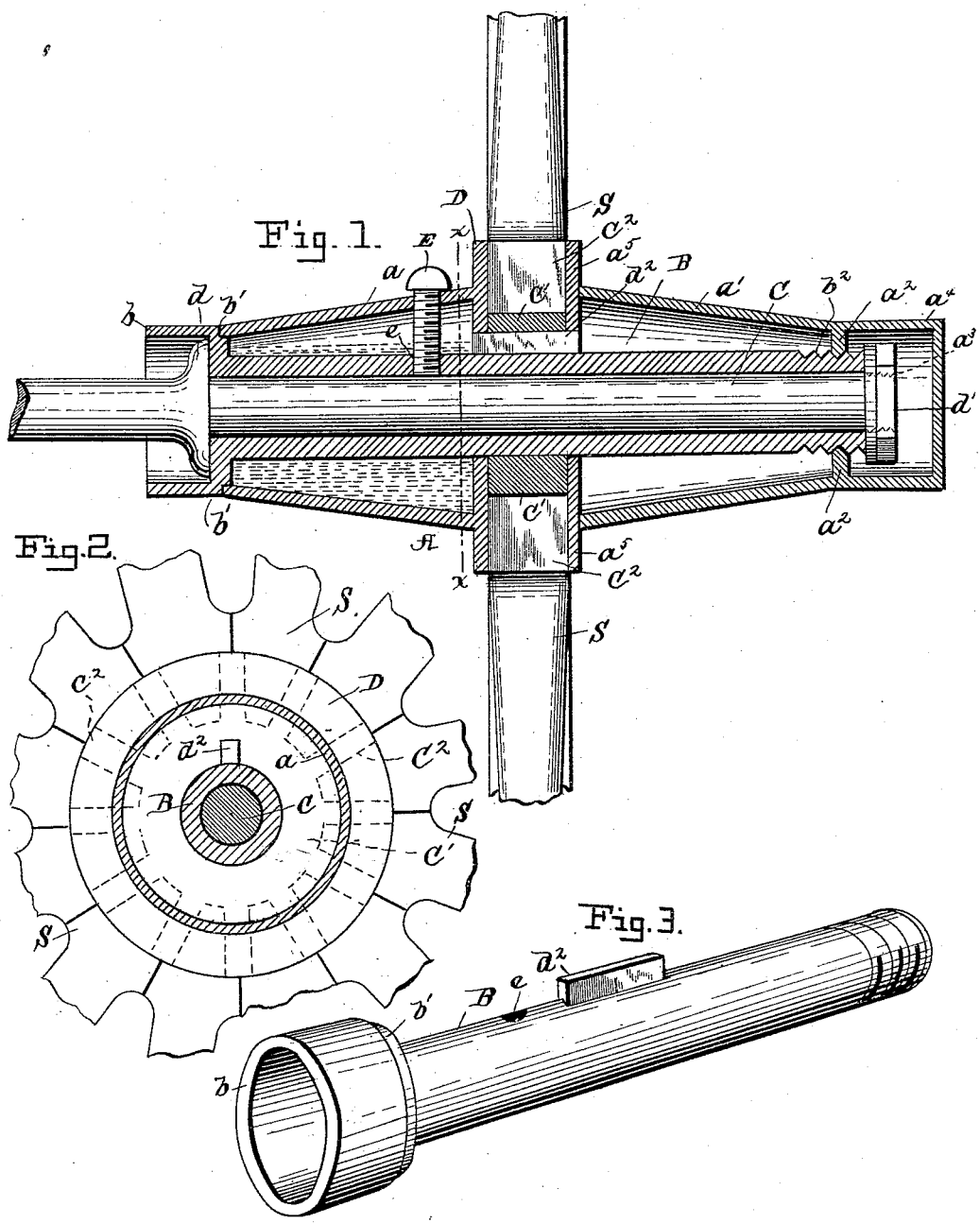

UNITED STATES PATENT OFFICE.

JAMES SHARKEY, OF FISHVILLE, MICHIGAN.

AXLE-LUBRICATOR.

SPECIFICATION forming part of Letters Patent No. 444,582, dated January 13, 1891.

Application filed November 12, 1890. Serial No. 371,190. (No model.)

*To all whom it may concern:*

Be it known that I, JAMES SHARKEY, a citizen of the United States of America, residing at Fishville, in the county of Montcalm and State of Michigan, have invented certain new and useful Improvements in Axle-Lubricators, of which the following is a specification, reference being had therein to the accompanying drawings.

This invention pertains to certain new and useful improvements in vehicle-wheels, having for its object the production of a new and improved, highly-efficient hub, and means for lubricating the axle and holding the wheel in position.

The invention comprises a hub having outer and inner sections, the latter forming a cup or receptacle for retaining lubricant, and a central cylinder or tube through which the lubricant flows to the axle, substantially as hereinafter fully set forth, and particularly pointed out in the claims.

In the accompanying drawings, Figure 1 is a vertical longitudinal sectional view of my improved wheel. Fig. 2 is a transverse sectional view on the line $x\,x$, Fig. 1. Fig. 3 is a detail view of the cylindrical sleeve or tube.

Referring to the drawings, A designates the hub, and $a\,a'$ the inner and outer sections thereof. The outer section $a'$ consists of a cone-shaped collar having in its outer reduced end a threaded wall or partition $a^2$, and in the inner surface of said end beyond said partition is formed a female screw-thread $a^3$, with which engages the thread of an end cap $a^4$. The inner end of this section is designed to bear firmly against a circular washer $a^5$, disposed against the inner ends of the spokes S, said end of the section fitting within a circular groove of said washer.

B is a cylindrical sleeve or tube, with the inner end of which is formed a flanged collar $b$, having a reduced portion $b'$, the outer end of said sleeve or tube being provided with a screw-thread $b^2$, with which engages the threaded wall or partition $a^2$ of the hub-section $a'$. This sleeve or tube is designed to be secured on the axle-skein C, whereon is formed a flange $d$, which limits the inner movement of said sleeve. A nut $d'$ on the outer end of skein C holds the sleeve in position, said nut being inclosed by the outer end of the outer section of the hub. Upon the sleeve or tube B is formed a rib or flange $d^2$, which is designed to enter corresponding slots in a spoke-securing plate C' and the ends of each section.

The inner section $a$ of the hub consists of a cone-shaped collar or cup, with the inner end of which is formed a circular plate or washer D, wherein is a central hole or opening for passage of the sleeve or tube B. The outer reduced or tapered end of this section $a$ is designed to fit snugly on the reduced portion $b'$ of collar $b$. Thus a cup or receptacle is formed by the inner section of the hub for retaining oil or other lubricant. A thumb-screw E is passed through a hole or aperture in section $a$, and its lower end is designed to engage a threaded aperture $e$ in sleeve or tube B. By turning this screw the lubricant in the cup or receptacle is fed to the axle-skein, and by placing said screw in engagement with the threaded aperture $e$ the wheel is held to its proper position.

The spokes S have their inner ends tapered or dovetailed, so that in case of accident one spoke can be replaced without disturbing the others. These inner ends of the spokes are held between radial arms $C^2$ of plate C'.

The rib or flange $d^2$ of sleeve B is designed to fit snugly in a correspondingly-shaped slot in the washers of the inner and outer sections of the hub and a similar slot in one of the spokes, whereby these parts are all held in proper relative position to each other.

From the foregoing description it will be seen that my improved wheel embodies many advantages in point of simplicity, durability, cheapness, and general efficiency, and that by means thereof the parts are held firmly together and the axle-skein is kept well lubricated.

I claim as my invention—

1. A wheel having its hub composed of inner and outer sections, one of which forms a cup or receptacle for a lubricant, and a screw working in said latter section for supplying the same to the axle-skein, substantially as set forth.

2. The herein-described wheel, comprising the hub having inner and outer sections, the central sleeve or tube having a hole or aperture, a cup or receptacle being formed by said inner section and the said sleeve, and the thumb-screw working in said hole or aperture and extended through said inner section, substantially as set forth.

3. The herein-described wheel, comprising the hub having inner and outer sections of cone shape, said inner section being provided with a plate or washer at its inner end, the sleeve or tube having a collar with which engages the reduced end of said inner section, the axle-skein, and the nut on the outer end thereof, substantially as set forth.

4. The herein-described hub, comprising the outer section having a threaded wall or partition, the sleeve or tube having a collar at one end, its other end being threaded to engage said wall or partition, the inner section having a plate or washer formed therewith and engaging said collar, and the thumb-screw working in an aperture of said sleeve or tube to regulate the lubricant-supply, substantially as set forth.

5. The herein-described wheel, consisting of the hub having the outer section provided with a reduced end and a threaded wall or partition, the inner section having a plate or washer formed therewith, the axle-skein having a shoulder and a threaded end, the sleeve or tube having a collar at its inner end, a hole or aperture, a thread on its outer end engaging said wall or partition, a rib or flange working in said hole or aperture, the nut on the outer end of said axle-skein, and the end cap inclosing said reduced end of the outer section, said rib or flange fitting correspondingly-shaped slots in the hub-section and spokes, substantially as set forth.

In testimony whereof I affix my signature in presence of two witnesses.

JAMES SHARKEY.

Witnesses:
ARTHUR STEERE,
NOAH SHARKEY.